(No Model.) 3 Sheets—Sheet 1.

C. O. MAILLOUX.
PUSH BUTTON.

No. 575,523. Patented Jan. 19, 1897.

WITNESSES:
Henry T. Hirsch.
W. H. Capel.

INVENTOR
Cyprien O. Mailloux.
BY H. C. Townsend
ATTORNEY.

(No Model.) 3 Sheets—Sheet 2.
C. O. MAILLOUX.
PUSH BUTTON.
No. 575,523. Patented Jan. 19, 1897.
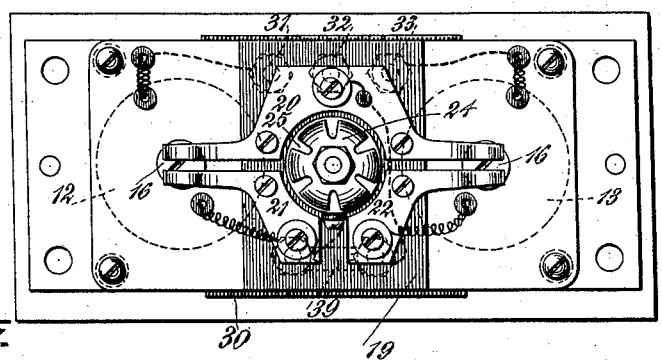
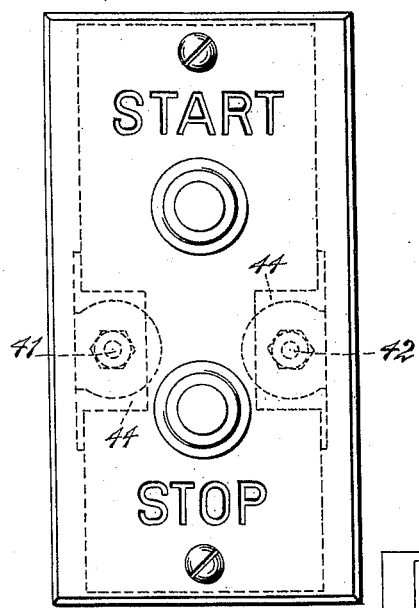
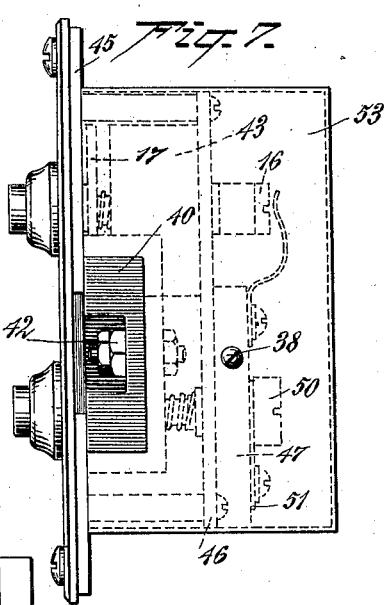
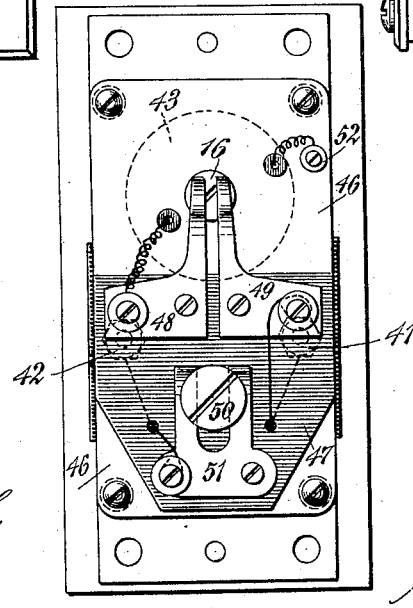
WITNESSES:
Henry T. Kirsch.
Wm. H. Capel.
INVENTOR
Cyprien O. Mailloux.
BY
H. C. Townsend
ATTORNEY.

(No Model.) 3 Sheets—Sheet 3.

C. O. MAILLOUX.
PUSH BUTTON.

No. 575,523. Patented Jan. 19, 1897.

WITNESSES:
Henry T. Hirsch.
Wm. H. Capel.

INVENTOR:
Cyprien O. Mailloux.
BY
Townsend
ATTORNEY.

UNITED STATES PATENT OFFICE.

CYPRIEN O. MAILLOUX, OF NEW YORK, N. Y.

PUSH-BUTTON.

SPECIFICATION forming part of Letters Patent No. 575,523, dated January 19, 1897.

Application filed June 4, 1896. Serial No. 594,230. (No model.)

*To all whom it may concern:*

Be it known that I, CYPRIEN O. MAILLOUX, a citizen of the United States, and a resident of New York, in the county of New York and State of New York, have invented a certain new and useful Improved Push-Button, of which the following is a specification.

My invention relates to that class of electrical switches commonly called "push-button," and particularly to a means of securely inclosing the circuit-controlling parts thereof against the admission of dust and insects.

The invention is designed with especial reference to the push-buttons or controlling-switches used in the elevator systems patented to me on April 2 and July 30, 1895, under numbers 536,730 and 543,495, respectively, though I contemplate applying it to any and all controlling-switches that require such protection, and especially to those that are to be let into walls or partitions. Incidental to the protection afforded to the mechanism my invention also secures a neatness of finish which especially adapts my push-buttons to the most elegantly-finished interiors. To simply incase a piece of mechanism against dust and insects is not, as a general thing, a difficult matter, but it is not so easy to incase such parts and still have the electrical connections thereto readily accessible. In my invention, however, the parts of the mechanism and the protecting devices are so constructed and combined that it is very easy to get at the circuit-terminals without in any way exposing the contact mechanism, so that when a push-button or a combination of push-buttons has been made up it may be set, or when set the circuit-conductors may be connected thereto or changed without opening into or disarranging the contact mechanism.

With these objects in view my invention consists in the construction, combination, and arrangement of parts hereinafter described, and set forth in the claims.

Figure 1:
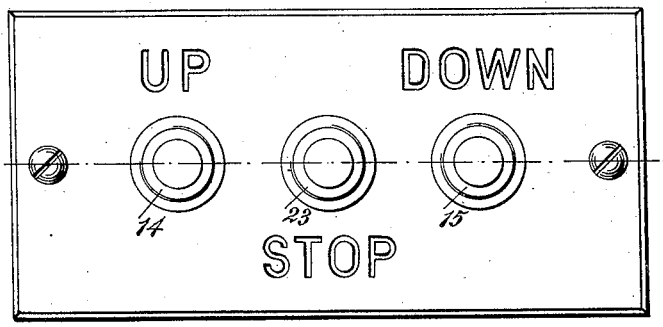
Figure 2:
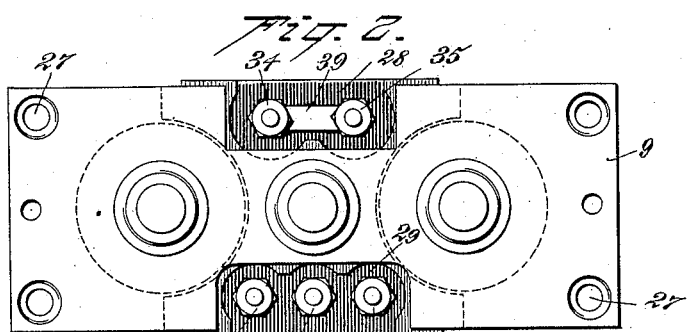
Figure 3:
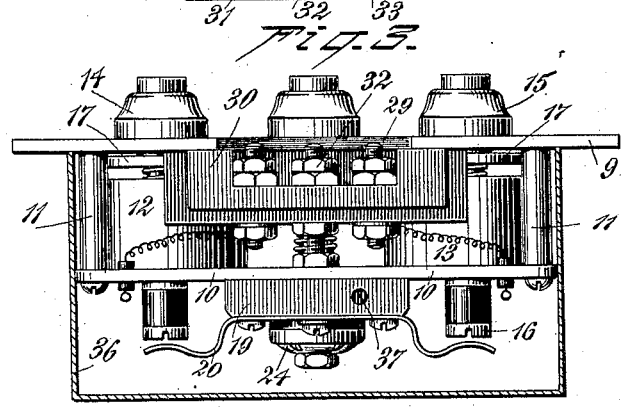
Figure 4:
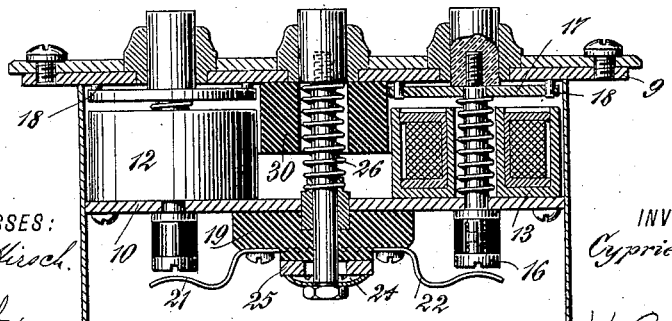
Figure 9:
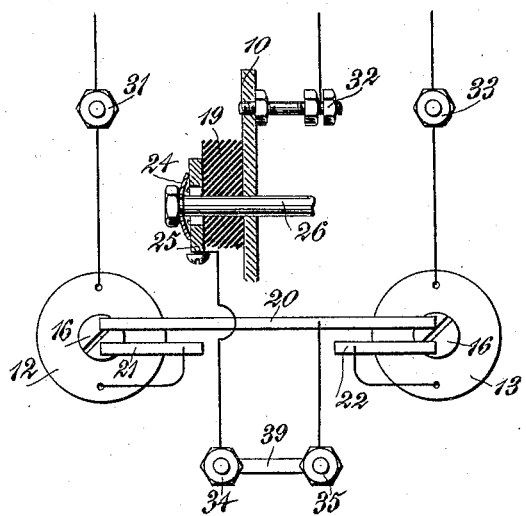
Figure 10:
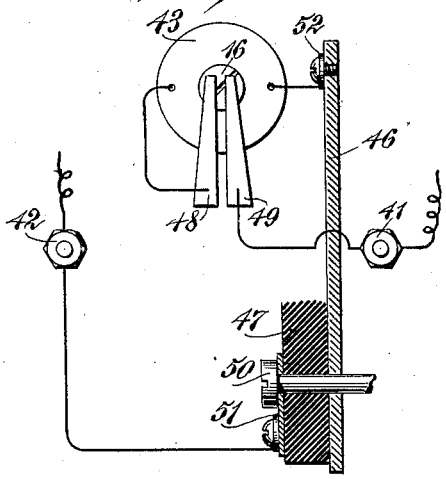

In the accompanying drawings, which form a part of this specification, Figure 1 represents in face view one form of my invention. Fig. 2 is a like view with the face-plate removed. Fig. 3 is a side elevation of the device with the casing in section. Fig. 4 is a vertical section through the same, taken in the plane indicated by line 4 4, Fig. 1. Fig. 5 is a rear view of the device with the casing removed. Fig. 6 is a face view of my invention embodied in another form. Fig. 7 is an edge view thereof with the casing in section. Fig. 8 is a rear view with the casing removed. Figs. 9 and 10 are diagrams of the circuits of the two forms of devices involved in the disclosure of the invention.

I have illustrated my invention in connection with self-holding push-buttons of the electromagnetic sort, such as are used in the elevator systems above referred to. In push-buttons of this sort the necessity for complete protection is far greater than in others where magnets are not used.

I have shown in Figs. 1 to 5 that combination of push-buttons which I have designed for use upon the car of a passenger-elevator wherein one button controls the upward movement of the car and another the downward movement, as indicated by the names "Up" and "Down" upon the face-plate of the device. In connection with these I also use a push-button controlling the return-circuit from the other two push-buttons, which acts to stop the movement of the car, whatever be its direction of travel, and has adjacent thereto upon the face-plate the word "Stop," as shown in Fig. 1. The self-holding magnets are of the sort illustrated and described in my patent first referred to.

The device in detail consists of a frame having a top plate 9 and a bottom plate 10, which are joined by suitable connecting-posts 11, which plates furnish a support for the various parts of the mechanism. The up and down magnets 12 and 13 are secured to the bottom plate, the stems of the push-buttons controlled thereby projecting at their outer ends through bosses 14 and 15, arising from the top plate 9, and their inner ends passing through the bottom plate and terminated by insulated contact-plates 16. These stems carry armatures 17, provided with one or more pins of non-magnetic material 18, which project slightly below their under surface to prevent sticking. About these stems are located spiral springs for returning them to place. To the bottom plate is secured a block of insulation 19, upon which is mounted a plate, as 20, provided with spring-terminals projecting into the path of the contact-plates 16. Upon this insulation are also mounted two separate plates 21 and 22, which are likewise provided with spring-terminals projecting into the path of said contacts 16, so that when the stems of buttons 14 or 15 are depressed circuit will be closed between the plate 21 or 22 and plate 20.

The stem of the stop-button plays through a boss 23 upon the top plate, extends through the bottom plate and the insulation 19, and has upon its inner end a contact-plate 24, preferably of the star pattern, as indicated, which engages with a disk 25, mounted upon a raised portion of insulation 19. The stem 26 of the stop-button is returned to place by means of a spiral spring placed about it, as indicated, which keeps the contact 24 closed upon the disk 25, said stem being in electrical contact with the metal of the frame.

The top plate 9 is made of special form in carrying out my invention. It is provided in the first place with holes 27 for bolts or screws by which it is to be secured in place, has the bosses for the push-button stems secured thereto, and is provided with the lateral notches 28 and 29. To the under side of this plate is secured a block of insulation 30, which is recessed at the notches 28 and 29 and has located therein at said recesses the circuit-terminals of the device represented at 31, 32, 33, 34, and 35. The terminal 32 is extended beyond the insulation to engage with the bottom plate 10, as indicated in Fig. 3. The lateral edges of the block of insulation 30 are rabbeted to provide a shoulder for engagement with the protecting casing 36, which is constructed to fit snugly against the rear surface of the top plate and to said shoulders, as in Fig. 7, it being secured in this position by any suitable means, as by screws passing through it into the edges of insulation 19, the hole for one of such screws being indicated at 37, one screw for this purpose in the second form of my invention being illustrated at 38, Fig. 7, wherein the casing is shown substantially as just described.

The recesses for the reception of the terminals just described are formed in such a manner that their walls shall extend to the top plate at all points about the notches, so as to allow no communication between said recesses and the interior of the frame. With the parts thus constructed and the casing in place all the contact mechanism of the device is securely inclosed, the circuit-terminals being exposed for making ready connection thereto upon the removal of the face-plate. This depression of the circuit-terminals in the surface of the case, as in the recesses in the plate of insulation (which recesses are preferably open at the sides, as shown) is an important feature, since access to said terminals is thereby rendered easy and the connection of conductors thereto greatly facilitated. The simple removal of the face-plate discloses these parts, and when in place said plate conceals them perfectly.

Between the terminals 34 and 35 I have shown a strip of metal 39, simply to complete the circuit between said terminals, which are designed to receive the ends of a branch or loop circuit that may be led to a circuit-breaker operated by the car-door, as set forth in the patent first referred to, should it be desired to use such additional safeguard. Between these terminals might also be placed a fuse for the protection of the magnets in case this apparatus should be used on a system where heavy currents might stray into the controlling system, but in my system such an event could not possibly occur.

The face-plate is provided with perforations to receive the bosses and with simply two screw-holes for its attachment to the top plate. This face-plate may therefore be ornamented in any desired manner to suit the location and conceals the securing means of the device.

In this combination of push-buttons the circuits are as illustrated in Fig. 5. The circuit to magnet 13, starting from terminal 33, extends through the coil of said magnet to plate 22, then, when the down-button is pushed, across the plate 16 to plate 20, thence through 39, and to disk 25, through contact 24, stem of stop-button 26, and the frame to terminal 32. The circuit through the up-button is over a corresponding route upon the operation of said button. When one of these buttons is pushed, circuit is closed, as just described, through the magnet pertaining thereto and the armature 17 is held down, maintaining the circuit until the stop-button is operated which separates contacts 24 and 25 in the return, deënergizes the magnet, and allows the stem of the button operated to return to place.

The other form of my invention (illustrated in Figs. 6, 7, and 8) is that embodied in what I have termed the "landing-switch" in my elevator system above referred to, which consists of the combination of an electromagnetic self-holding push-button and a stop-button, the former being constructed as just described and the latter differing from the stop-button just described only in the contacts controlled thereby. The block of insulation 40 is substantially the same as the block 30 just described, with the exception that the recesses are smaller, as they are designed simply to receive the two terminals 41 42 of the circuit of the electromagnet 43. (Shown in dotted lines in Figs. 7 and 8.) These recesses are located at lateral notches 44 in the top plate 45 in the same manner as previously described. To the bottom plate 46 of the frame of this device is secured a plate of insulation 47, on which is mounted a pair of springs 48 49, in the circuit of the magnet 43, which are connected, upon the operation of the push-button, by the plate 16, as in the previous instance. The stop-button carries at its inner end a head 50, which is normally in contact with a plate 51, mounted upon the insulation 47. The circuit for this device is outlined in Fig. 8, and extends, upon operation of the start-button, from terminal 41 over spring 49, contact-plate 16, spring 48, to and through the coil of magnet 43, to the bottom plate, as at 52, thence to the stem of the stop-button and through contact-head 50 and plate 51 to the terminal 42. To break this circuit, the stop-button is operated, which carries the head 50 away from its contact-plate. The contact mechanism of this combination of push-buttons is protected in the same manner as that previously described, the casing 53 being fitted snugly to the top plate 45 and to the shoulders formed on the recessed insulation 40. The face-plate is formed also in a manner similar to that of the device previously described, and has marked thereon the words "Start" and "Stop," to designate the self-holding push-button and the circuit-breaking push-button.

I may and by preference do dispense with the stop-button in the device last described, since in the system referred to the car automatically stops at the floor of the button operated, and the stop-button simply to stop the car on change of purpose would be of little use. The omission of the stop-button tends then rather to the simplification of the system without affecting its efficiency. The omission of this part would somewhat shorten the case of the device, Figs. 6, 7, and 8, but would not otherwise change its construction. The return-circuit from the magnet, however, would then lead directly to terminal 42.

The casings 36 and 53 are preferably formed of thin sheet metal, though they may be constructed of any desired material, and the frame may be changed in form and construction from that described, and various other changes may also be made without departing from my invention, the gist of which resides in thoroughly protecting the contact mechanism in a manner such that the circuit-terminals may be exposed and rendered accessible at all times without opening into the chamber containing the parts to be protected, and in concealing the circuit-terminals and the means of attachment for the device in a manner to render them easily accessible and yet provide a neatly-finished exterior for the entire device.

What I claim as my invention is—

1. The combination of the contact mechanism in a push-button or a collection of push-buttons, a case inclosing the same, the circuit-terminals of said mechanism located exteriorly to said case, and a removable face-plate covering said terminals.

2. The combination with a supporting-frame, of one or more push-buttons mounted therein, a block of insulation mounted on said frame, circuit-terminals located in said block, a casing fitted to said frame and to the insulation to inclose the contact mechanism, and a removable face-plate covering the frame, the insulation and the circuit-terminals.

3. The combination with the frame having the notched top plate, of the push-buttons mounted in the frame, the block of insulation mounted under and closing the notches in the top plate, the circuit-terminals mounted in the insulation and accessible from the upper side thereof, a casing inclosing the contact mechanism, and a face-plate removably secured to the upper plate of the frame and covering the circuit-terminals.

4. The combination with the frame having a laterally-notched top plate for securing the frame in place and provided with projecting perforated bosses, of push-buttons mounted in the frame and having stems protruding through said bosses, circuit-terminals located in the notches of the top plate, and a removable face-plate covering the terminals and bearing designations for each push-button and perforated to receive said bosses.

5. The combination with the frame having a bottom plate and a laterally-notched top plate by which the frame is secured in place, of one or more electromagnetic self-holding push-buttons mounted in said frame, the stem of each protruding through the bottom plate and having a contact-piece thereon, a push-button having a normally-closed contact in the return-circuit of said self-holding push button or buttons, contact-springs mounted on and insulated from the bottom plate of the frame and coöperating with said contact-pieces on the push-button stems, circuit-terminals mounted on insulation in the notches of the top plate, a casing inclosing the electro magnet or magnets and the contact mechanism, and a face-plate removably secured to said top plate.

Signed at New York, in the county of New York and State of New York, this 3d day of June, A. D. 1896.

CYPRIEN O. MAILLOUX.

Witnesses:
  WM. H. CAPEL,
  D. H. DECKER.